Patented June 26, 1934

1,964,143

UNITED STATES PATENT OFFICE 1,964,143

PRESSURE PROCESS FOR CANNED PINEAPPLE

Robert Brooks Taylor, Kapaa, Kauai, Territory of Hawaii

No Drawing. Application June 28, 1930, Serial No. 464,710

2 Claims. (Cl. 99—8)

My invention relates to improvements in a pressure process for canned pineapple, and it consists in the steps hereinafter mentioned.

Existing processes can be described as follows. After the pineapple is sliced and put in the can, it is taken to the processing line where a solution of either juice and sugar or water and sugar is added, and the product then passes through an exhaust box or previous heating device where the temperature of the product is brought to about 165° F., after which the top of the can is sealed or seamed to the remainder, and the product thus hermetically sealed is then sterilized. The object of the exhaust box or previous heating device is to drive out the air and produce a moisture vapor which will condense after the closure of the end of the can, thus creating a partial vacuum in the can. The syrup is added by a syruping machine, usually, though at some places it is added by hand. It may be added before or after the product passes through the exhaust box.

Pineapple thus prepared is limited to variations in color, depending upon the pineapple from which the slices are obtained and depending upon the general ripeness of the fruit. Pineapple is a collection of small fruits, and the bottom of the general cluster of the general fruit ripens prior to the fruit at the top of the pineapple. Thus the pineapple is ripe at the bottom and not sufficiently ripe at the top, or slightly over-ripe at the bottom and properly ripe at the top. This, I think, is the general tendency of the fruit.

Efforts of the packers have been put forth to getting the pineapple cluster to ripen throughout its entirety simultaneously, but their efforts have been met with only a reasonable degree of success. The slices obtained from pineapple show more or less light spots of fibres, and these are apparently objectionable to the customers, though it is not believed that there is any lower quality of fruit by their presence. It is mostly a matter of appearance.

To escape this and to make the slices more or less uniform in color and texture, there has come into use a vacuumizing machine through which the pineapple, after it is sliced and placed in the can, is passed, and it is subjected to a partial vacuum which is almost immediately released and the pineapple comes again into the normal pressure of the air. This process tends to make the slices more uniform in color and overcome the objections outlined hereinabove.

The principle of this vacuumizing machine is as follows: The pineapple slices being subjected to a partial vacuum, the air pressure inside, which has been equal to the air pressure outside of the plant when it was growing (normal barometric pressure), forces its way out of the slices, and immediately thereafter the vacuum being broken, the air tries to get back into the slices of pineapple. Thus there is a slight expanding and disrupting effect similar to that in puffing rice as the vacuum is quickly applied followed immediately by a slight compression of the slices due to the increased pressure of the air over that which is now inside the slices.

It will be seen that the greatest differential in pressure which can be obtained in this process is the difference between the greatest vacuum obtainable at the barometric pressure existing and the pressure of the air outside which could hardly exceed 14.7 pounds per square inch, even theoretically, under normal conditions. Since this vacuum is applied for a second or two and then immediately released, it will be seen that the greatest differential which might be expected will be only, as a matter of fact, perhaps one or two pounds. In any case, it will be only a small fraction of the barometric pressure of the air at the point where the pineapple is canned.

Now I have devised a method of reversing this procedure. I propose to apply the pressure first and then release the pressure to ordinary atmospheric pressure. It will be seen that by this process it is possible to have a very great differential in pressure, depending entirely upon the amount of initial pressure with which the process begins. It is even theoretically possible that a high pressure, hundreds or even thousands of pounds per square inch, would still function in this process. It need not necessarily be an air pressure, as it can be a pressure in water or some other gas or any fluid which will not be objectionable to the product. It will be seen immediately that by applying a pressure and then immediately releasing this pressure, this differential in pressure, instead of being a fraction of the atmospheric pressure by barometric reading at that point, will be many times these figures. I have tested this method and find that the results are as expected.

Other objects and advantages will appear as the specification proceeds, and the novel features will be particularly pointed out in the claims hereto annexed.

In order to simplify the operations of canning, therefore, I have devised this principle. The vacuumizing machine no longer being required, the pineapple will be passed into a high pressure exhaust box by means of suitable valves, which have already been devised and which are successfully operating on other machines now on the market. Thus the exhaust boxes or previous heating devices will naturally be smaller and occupy less floor space than those existing because of the higher temperature obtainable in these exhaust boxes with steam under pressure. They will heat the slices more rapidly. Moreover, the pressure of the steam will provide the additional pressure which is necessary to this scheme or method of canning. Immediately upon release of the pineapple into the open air, the pressure again adjusts itself to the barometric pressure more or less, and the syrup will then be applied in the cans in regular fashion.

Thus this provides a very definite saving in floor space and in the time required for canning, and at the same time permits the product to undergo this compression principle, thus causing the slices to approach the same color and texture. It resembles an artificial ripening process. I have tried slices which are unusually light in appearance and have had them come through the process excellently translucent and of a much improved color. The objectionable light features in the slices are more or less eliminated, or at least are reduced very much, and a general golden yellow appearance is obtained. Thus the product is more uniform in appearance, and if the slices vary in color in the can originally, they tend to approach the same color which is a golden yellow color.

The appearance of practically all the fruit is greatly improved, and thus the salability of the product is much enhanced. I do not wish this process to be limited to the canning of pineapple, as it very likely will be equally applicable to many other fruit products which undergo similar processes.

I claim:

1. The herein described steps in the process of canning pineapple or the like which consists in subjecting the fruit to a steam pressure greater than atmospheric pressure for simultaneously cooking the fruit during the canning operation and then removing the fruit from the steam and bringing it into atmospheric pressure for causing a change from an opaque appearance to a uniform translucent one the differential in pressure being greater than that obtainable by the use of sub-atmospheric pressure.

2. The herein described steps in the process of canning pineapple or the like which consist in subjecting the fruit to heat and pressure greater than atmospheric pressure for compressing the cellular structure of the fruit and simultaneously cooking the same and then reducing the pressure to atmospheric for expanding the cellular structure and thereby causing a change from an opaque appearance to a translucent one, the differential in pressure being greater than that obtainable by the use of sub-atmospheric pressure.

ROBERT BROOKS TAYLOR.